May 23, 1939.   B. COLMAN   2,159,320

CAR LOADING DEVICE

Filed March 13, 1935

INVENTOR.
*Ben Colman.*
BY
*Harness, Dickey, Pierce & Han*
ATTORNEYS.

Patented May 23, 1939

2,159,320

UNITED STATES PATENT OFFICE 2,159,320

CAR LOADING DEVICE

Ben Colman, Detroit, Mich., assignor to The Worth Company, a corporation of Michigan Application March 13, 1935, Serial No. 10,811

1 Claim. (Cl. 248—119)

The invention relates to loading devices and it has particular relation to devices for anchoring automobiles in freight cars for transportation purposes.

In the loading of automobiles in freight cars, it is known that anchoring of the chassis frame of the automobile is highly important for the reason that practically the entire weight of the automobile is solidly mounted on the frame and, therefore, in anchoring the frame, practically the entire weight of the automobile is anchored solidly. If only the axles of the automobile are anchored, considerable movement of the upper and major portion of the automobile may take place, particularly during jolting of the freight car, as the chassis frame is supported on the axles by springs. Flexing of the springs necessarily permits some movement of the upper portion of the automobile and considerable damage has been caused by the body of the automobile engaging parts of the car or equipment therein during this springing movement of the body. In my Patent No. 2,064,415 of December 15, 1936, an anchoring means is disclosed for anchoring the frame of the automobile and, while this has been satisfactory, it is difficult to employ it in certain constructions of automobiles now manufactured. The reason for this is that the fastening of shock absorbers, fenders and other parts of the automobile on the chassis frame in certain automobile constructions practically precludes the use of anchoring devices that project laterally from the sides of the frame owing to the lack of room or space at the sides of the frame for allowing anchoring devices to be properly applied and used.

The object of the present invention is to provide a frame anchoring device which will not interfere with various parts of the automobile projecting along the sides of the frame.

For a better understanding of the invention, reference may be had to the drawing forming a part of the specification, wherein.

Figure 1:
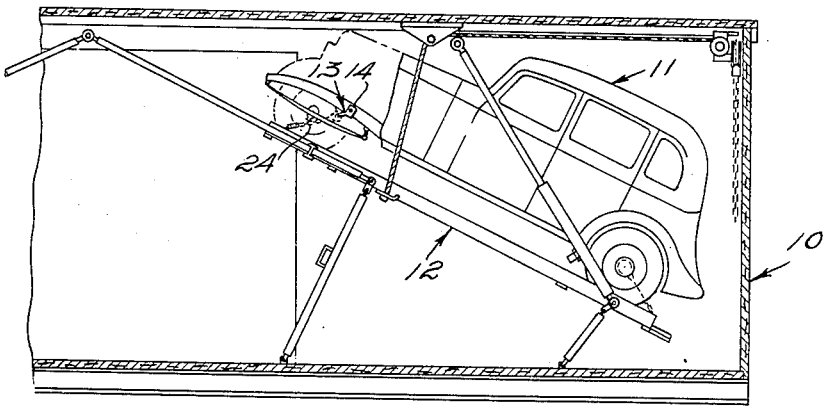
Figure 1 is a fragmentary and cross sectional view of a freight car having an automobile anchored therein by means constructed according to one form of the invention.

Referring to Fig. 1, the freight car is indicated at 10, the automobile therein at 11, and an elevating and holding frame at 12. The frame construction 12 and the means for elevating it and holding it in semi-decking position form no part of the present invention and are substantially the same as disclosed in the patent of Samuel D. Butterworth, Patent No. 2,079,930 of May 11, 1937. It may be mentioned, however, that for anchoring the automobile on the frame, chain members are employed, as also disclosed in said co-pending application for patent. While a decked automobile is shown, an automobile on the floor could have been shown, in which event chain anchoring devices substantially as disclosed in the patent of Samuel D. Butterworth, 2,078,052 of April 20, 1937, would be used. The present invention is concerned only with the connection of such chain devices to the chassis frame whether the automobile is in a semi-decking position or on the floor of the freight car.

Figure 2:
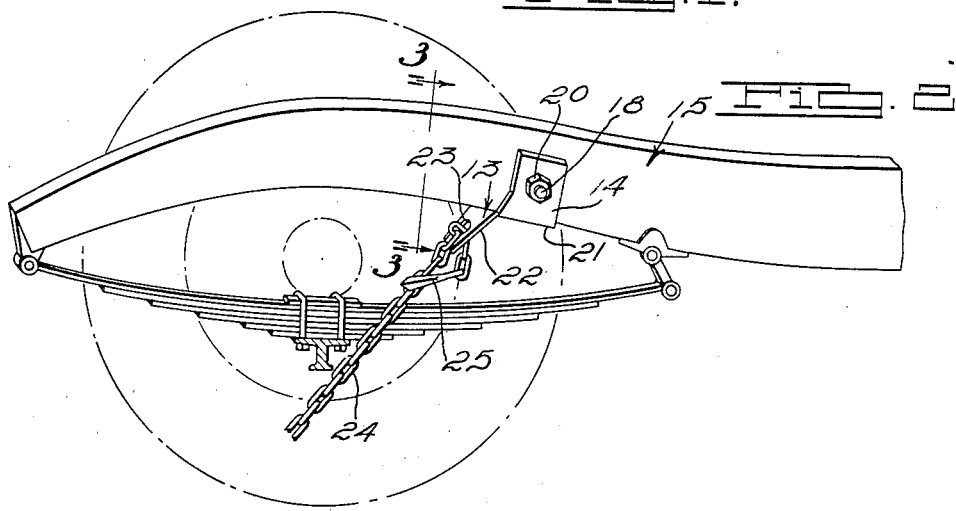
Fig. 2 is a detailed view, illustrating how each anchoring means may be connected to the chassis frame of the automobile.
Figure 3:
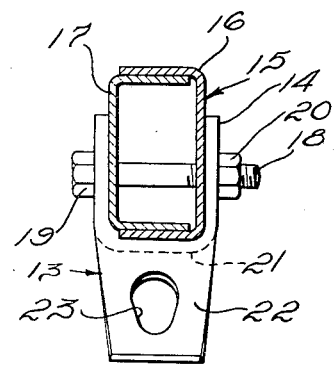
Fig. 3 is a cross sectional view, taken substantially along the line 3—3 of Fig. 2, with the chain removed.

Referring to Figs. 2 and 3, the means for anchoring the chassis frame includes a plate member 13 having a bifurcated portion 14 adapted to straddle the chassis frame of the automobile, indicated at 15. The chassis frame, as illustrated, is of box character and comprises channel members 16 and 17, which are telescopically related and welded along the free edges of the legs of section 16. The bifurcated portion 14 is connected to the frame member 15 by means of a bolt 18 having a head 19 on one end and a nut 20 on its other end, and includes a base portion 21 that substantially contacts with the lower side of the frame. At its forward edge, the bifurcated portion 14 and the base portion 21 merge into a downwardly and forwardly projecting plate portion 22 having an aperture substantially at its center as indicated at 23, with the upper side of the aperture larger than the lower side.

In anchoring the frame in position, a chain, indicated at 24, is passed through the larger part of opening 23 and the free end of the chain is fastened to the main part of the chain by means of a grab hook 25.

It will be noted that the portion 22 of the attaching plate depends below the frame member 15 and in substantially the plane thereof, and, accordingly, is easily accessible when the chain 24 is to be connected thereto. It will be noted also that the bifurcated portion 14 does not require much linear space along the side of the frame, and this is desirable because, at least in certain constructions of automobiles, only a very limited linear space on the side of the frame is available owing to the presence of shock absorber connections, fender connections and other parts of the automobile disposed along the side of the frame. Such auxiliary parts along the side of the frame would make it difficult to provide an anchoring member on the side of the frame and, furthermore, it would be more difficult to extend the chain thereto owing to interference as a result of the presence of such auxiliary parts of the automobile. The present arrangement enables anchoring from a point below the frame member and in the vertical plane thereof, and at a location which does not interfere with the auxiliary parts of the automobile mounted along the side of the frame member and furthermore, it enables disposing the chain in such manner that it will not contact with or undesirably engage parts of the automobile disposed in the vicinity of the frame member.

While anchoring devices such as that disclosed may be employed in conjunction with both ends of the chassis frame of the automobile, ordinarily it need be employed only at one end of the frame. The other end of the automobile may be anchored by engaging the chains with the axles. This is true because the stability of the frame and body of the automobile may be sufficiently taken care of by anchoring only one end of the chassis frame, as this will sufficiently avoid springing of the body and the chassis frame.

Although more than one form of the invention has been illustrated and described in detail, it will be apparent to those skilled in the art that various modifications may be made without departing from the scope of the appended claim.

What is claimed is:

An attaching member adapted to be connected to a frame member of an automobile comprising an integral sheet of metal of substantial T shape initially, said sheet of metal having the ends of the arms of the T bent in one direction from the plane of the mid-portion of said arms to embrace opposite sides of the frame, and having the stem of the T bent in the opposite direction from the mid-portion of said arms and provided with an aperture, said end portions of the arms being provided with means for securing them to the frame member.

BEN COLMAN.